Patented Jan. 13, 1925.

1,523,220

UNITED STATES PATENT OFFICE.

WALTER H. KAUL, OF WEST COLUMBIA, TEXAS.

METHOD OF AND REAGENT FOR DEHYDRATING OILS.

No Drawing. Application filed March 28, 1922. Serial No. 547,546.

*To all whom it may concern:*

Be it known that I, WALTER H. KAUL, a citizen of the United States, residing at West Columbia, in the county of Brazoria and State of Texas, have invented certain new and useful Improvements in Methods of and Reagents for Dehydrating Oils, of which the following is a specification.

This invention relates to methods of, and re-agents for, dehydrating oils, and has for its object, to provide a method which will be more simple to carry out and more efficient than those which have been heretofore proposed, as well as to provide a dehydrating agent which will be comparatively inexpensive, and more efficient in its action than the prior dehydrating agents now employed.

With these and other objects in view, the invention consists in the novel steps and combinations of steps, constituting the method, and in the novel compound or mixture, constituting the dehydrating agent, all which will be more fully hereinafter disclosed, and particularly pointed out in the appended claims.

As was pointed out in my prior co-pending application, filed January 25, 1922, Serial #531,690, and entitled "Method of treating oil," a large amount of crude oil is produced in the Gulf States, which is mixed with a relatively high percentage of water in a more or less emulsified state, as well as other impurities of complex chemical combinations, which impurities render the oil unfit for commercial use.

It has been found to be an exceedingly difficult and expensive operation to separate the oil from the water and other impurities mixed therewith, inasmuch as merely permitting the mixture to stand or even boiling it for extended periods have little or no effect in causing the desired separation. For this reason very large quantities of these "roily" oils, as they are called, have been collected in large earthen or steel reservoirs, in the hope that some means may be discovered of readily and efficiently separating the water and other impurities from the oil, to the end that the said oil may be rendered of commercial value.

In my said prior co-pending application, I have disclosed a method for recovering relatively large percentages up to, say 90% or 95% of the crude oil contained in these mixtures, by the application thereto of a relatively small amount of molasses glucose, glycerine, and the like, after which the treated oil is heated for a predetermined period, whereupon it is found that a very effective separation of the oil from the water and other impurities, has been accomplished.

On the other hand, the use of the molasses, glycerine, glucose, and the like, alone, as a dehydrating agent, necessitates the employment of heat, in order to render the separation as effective as is desirable, and the supplying of this heat necessarily involves an additional expense in the form of fuel and a suitable apparatus for carrying out the heating.

I have found, however, that if a small amount of "cresol" $C_7H_8O$ or "creosote," derived either from wood or coal tar, is mixed with the molasses, glucose, or glycerine, that a very high separation of the impurities from the oil may be had, without the necessity for heating the mixture. When such a mixture of, say molasses and creosote or cresol, is employed, the latter constituents act as very strong solvents, which seem to break down or destroy the tough envelope or tissue which seems to hold the small globules or water in suspension within the oil, thereby permitting the molasses or other dehydrating agent employed, to come into intimate contact with the said water.

As was pointed out in my said prior application, the intimate mixing of the water held in suspension in the oil, with the molasses, has an effect of increasing the specific gravity of the impurities to such an extent that they will rapidly settle to the bottom of the mixture after the addition of the dehydrating agent, thus leaving the relatively pure oils floating upon the top, from whence they may be drawn off, as desired, and either refined, or subjected to any other treatment which may be necessary.

I have found from actual tests, that a dehydrating agent composed of approximately 90% by volume of black strap molasses, saccharine, glucose, glycerine, or other like viscous substances, and 10% of cresol, coal tar creosote or wood creosote, will give excellent results in causing the separation and settling out of the water and other impurities, contained in the usual "roily" oils, to be found in the Texas, Oklahoma, and other fields.

The said "roily" oils, due to the impurities contained therein, are usually of a somewhat different color from the purer oils, but upon treatment with the present dehydrating agent, the purified oil which is drawn off from the top of the reservoir, is of the usual desired color, the dehydrating agent having eliminated from the oil, the matter which changes the color thereof.

In some few cases, where the oils are very much discolored due to the basic sediment contained therein, it has been found that a relatively small amount of heat will facilitate the separation of this coloring matter to the end that the proper color may be restored to the oil. However, where the color of the oil is of no importance, this heat need not be employed for the mixture of molasses and creosote, or cresol, will effectively separate out the water, slimes, and other impurities, whether the heat is employed or not.

As was pointed out in my said co-pending application, Serial #531,690, owing to the viscosity of the syrup, glycerine, and the like, it may be desirable to add to the dehydrating agent, suitable quantities of water, in order that the said agent may more readily permeate through the oil mixture. This holds true when employing the present dehydrating agent, as there is no objection to adding water to the mixture of molasses, glycerine, or the like, and the creosote or cresol.

On the other hand the addition of the water in many instances, facilities the separation and settling of the impurities.

By the term "creosote" employed in this specification, is meant the usual and well known commercial product of either the wood or coal tar variety, which may be purchased in the open market.

It is obvious that those skilled in the art may vary the steps constituting the process, as well as the precise ingredients and proportions thereof constituting the dehydrating agent, without departing from the spirit of the invention, and therefore it is not wished to be limited to the above disclosure, except as may be required by the claims.

What I claim is:

1. The method of treating "roily" oil to dehydrate and purify the same which consists in introducing into said oil a reagent comprising a heavy viscous organic liquid having a relatively high affinity for water and a cresolic substance; and permitting the mixture to stand, whereby the impurities may separate from the oil.

2. The method of treating "roily" oil to dehydrate and purify the same which consists in introducing into said oil a reagent comprising a heavy viscous organic liquid having a relatively high affinity for water and creosote; and permitting the mixture to stand, whereby the impurities may separate from the oil.

3. The method of treating "roily" oil to dehydrate and purify the same which consists in introducing into said oil a reagent comprising molasses and a cresolic substance; and permitting the mixture to stand, whereby the impurities may separate from the oil.

4. The method of treating "roily" oil to dehydrate and purify the same which consists in introducing into said oil a reagent comprising molasses and creosote; and permitting the mixture to stand, whereby the impurities may separate from said oil.

5. A dehydrating and purifying agent for treating oils comprising a heavy, viscous organic liquid having a relatively high affinity for water and a cresolic substance.

6. A dehydrating and purifying agent for treating oils comprising a heavy, viscous organic liquid having a relatively high affinity for water and a cresolic substance in approximately the proportions of 90% of the former to 10% of the latter.

7. A dehydrating and purifying agent for treating oils comprising molasses and a cresolic substance.

8. A dehydrating and purifying agent for treating oils comprising molasses and a cresolic substance in the approximate proportions of 90% of the former and 10% of the latter.

9. A dehydrating and purifying agent for treating oils comprising a heavy, viscous organic liquid having a relatively high affinity for water, and creosote.

10. A dehydrating and purifying agent for treating oils comprising a heavy, viscous organic liquid having a relatively high affinity for water, and creosote in the approximate proportions of 90% of the former and 10% of the latter.

11. A dehydrating and purifying agent for treating oils comprising molasses and creosote.

12. A dehydrating and purifying agent for treating oils comprising molasses and creosote in the approximate proportions of 90% of the former and 10% of the latter.

In testimony whereof I affix my signature.

WALTER H. KAUL.